United States Patent [19]
Williamson et al.

[11] Patent Number: 5,991,269
[45] Date of Patent: Nov. 23, 1999

[54] WIRELINE MODEM, COMMUNICATION SYSTEM AND METHOD OF SETTING-UP SUCH

[75] Inventors: Roger James Williamson, Much Hadham; Igor Kajetan Czajkowski, Bishop Stortford, both of United Kingdom

[73] Assignee: Northern Telecom Limited, Montreal, Canada

[21] Appl. No.: 09/153,393

[22] Filed: Sep. 15, 1998

[51] Int. Cl.$^6$ .................................................. G01R 31/08
[52] U.S. Cl. .......................... 370/241; 370/484; 375/222; 375/227
[58] Field of Search ..................... 370/203, 208, 370/210, 484–485, 486, 432, 437, 494–522, 503, 509, 468; 375/222, 227, 258, 260

[56] References Cited

U.S. PATENT DOCUMENTS

| | | | |
|---|---|---|---|
| 4,589,111 | 5/1986 | Adachi | 371/32 |
| 4,630,126 | 12/1986 | Kaku et al. | 358/280 |
| 4,780,883 | 10/1988 | O'Connor et al. | 370/468 |
| 5,285,474 | 2/1994 | Chow et al. | 375/222 |
| 5,461,640 | 10/1995 | Gatherer | 375/231 |
| 5,539,777 | 7/1996 | Grube et al. | 370/207 |

*Primary Examiner*—Chau Nguyen
*Assistant Examiner*—Phuongchau Ba Nguyen
*Attorney, Agent, or Firm*—Lee, Mann, Smith, McWilliams, Sweeney & Ohlson

[57] ABSTRACT

To avoid spurious energy radiation from a wireline communication resource (42–44) supporting data over voice, such as in xDSL, modems (40, 46) supporting a multi-carrier transmission scheme undertake a line balance assessment (136–138) for each sub-channel carrier within the system. Specifically, an addressed modem (40) measures, for example, the signal to noise ratio of a differential transmission mode and a common transmission mode to provide the balance assessment (138). More particularly, a receive chain in the addressed modem is selectively switched (84) to receive the differential mode as appearing across the terminals of an isolation transformer (66) or the common mode (as seen with respect to ground) from a center tap (88) in a line-side winding (70) of the isolation transformer (66). Any sub-channel carrier that fails to provide a predetermined level of balance (140) is de-selected (141) by the modem and not used for traffic. Generally, the modems (40, 46) at both ends of the wire-line connection (42–44) notify one another of selected sub-channels, while the concept can be employed in a dynamic in-call fashion (152, 158–160).

31 Claims, 5 Drawing Sheets

FIG.3cont.

WIRELINE MODEM, COMMUNICATION SYSTEM AND METHOD OF SETTING-UP SUCH

BACKGROUND TO THE INVENTION

This invention relates, in general, to a wireline modem and a method of setting up such a modem for communication, and is particularly, but not exclusively, applicable to the modems that support digital subscriber line (xDSL) communication protocols in bidirectional wireline systems that inherently radiate energy.

SUMMARY OF THE PRIOR ART

Telecommunication systems that interconnect wireline subscriber terminals are being developed to support broadband data communication. More particularly, recent developments in broadband communication protocols allow broadband data to be overlaid on narrowband voice or integrated service digital network (ISDN) traffic. Specifically, the interconnection of broadband modems located at the subscriber terminal and at an exchange allow current broadband access systems to communicate on spare spectrum (i.e. spare frequency channels) of a twisted pair communication resource; the spare frequency channels being isolated from conventionally encoded voice signals by a suitable filter. In this respect, and depending upon the complexity of the xDSL coding scheme, overlaid broadband systems can support data rates in excess of two Megabits per second (Mbps), although this rate is dependent upon the physical parameters of the connection, e.g. the overall length of the twisted pair and its composition and configuration.

Asymmetric Digital Subscriber Line (ADSL) and Highspeed Digital Subscriber Line (HDSL) protocols, for example, can support data rates of 2 Mbps over distances of approximately three kilometers, while more complex schemes (such as VDSL) can support data rates of 8 Mbps and above over distances of, typically, less than two kilometers. Protocols such as Very high-speed Digital Subscriber Line (VDSL) utilise multiple sub-channel carriers, e.g. in a discrete multi-tone (DMT) environment, to provide an adaptive system that mitigates the effects of cross-talk by selectively ignoring noise-effected sub-channel carriers or reducing the number of bits supported by the sub-channels. As will be appreciated, DMT provides a comb of frequency carriers that are each separated modulated and then combined to generate a composite signal envelope. As such, information (both control information and traffic) is distributed across a number of different frequency carriers, with information separately modulated onto each sub-carrier.

In relation to the transmission of a signal along a wire or cable, generally, such transmissions inherently radiate energy from the wire or cable. Such radiated energy is detrimental to the frequency spectrum since it causes interference that can be picked up by electronic and electrical equipment. For example, the transmission of an alternating current at mains voltage along a power cable can sometimes be heard as "mains hum" on a telephone handset. Clearly, although mains hum can be effectively filtered by virtue of its relatively low frequency (typically fifty Hertz, 50 Hz), some positive action is required to isolate this form of interference, which action will attenuate or apply small distortions to a wanted signal envelope. Transmissions of high frequency signals, however, are of significantly greater concern and present a considerably greater radiation problem because of both the relatively wide bandwidth attributed to these signals and the actual operating frequencies used. Furthermore, in a time division duplex system, the switching rates between up-link and down-link transmissions can also generate interference.

In relation to a wireline communication resource, such as a two-wire system, transmission of an information-bearing signal down the wireline communication resource is preferably in a differential (or transverse) mode in which in-phase and anti-phase signals are supported on the respective wires. Beneficially, the relative phases between the two wires effectively provides field cancellation in a perfect (i.e. balanced) cable. Unfortunately, however, the cables and wires used for wireline transmission systems have slight physical variations (caused, for example, by fixture mechanisms, junctions, circuit taps or physical dimensions) that result in mismatches and hence a mode conversion from differential mode transmission to either a common mode or a hybrid common-differential mode. Both the common mode and the hybrid common-differential mode have increased levels of radiation (relative to differential mode) from the wireline transmission. As will be appreciated, there is constructive (phase) reinforcement in the common mode (relative to an arbitrary ground) that results in a general increase in radiated power, whereas the hybrid mode exhibits both time-varying constructive and destructive reinforcement.

Considering a wireline system in more detail, a termination of the wireline is generally arranged to be balanced by a balun (balanced-unbalanced) line interface that provides access into and out of a modem, for example. However, as previously indicated, imperfections in the wireline result in the introduction of stray impedances that act as transmission mode conversion points. The cumulative effects of these stray impedances (such as a capacitance to ground) can periodically act to establish a resonance node from which a standing wave can be established, i.e. the node appears at a point in the cable where the impedance changes abruptly. Furthermore, with increasing frequency, the significance of each stray capacitance (that produces mismatch between the lines) is accentuated and so the wireline system suffers increased radiation problems caused by the establishment of undesirable standing waves between adjacent nodes.

Signal transmission in a cable can therefore be regarded as a mixture of transmission modes in which any point in the cable has a transmission characteristic $DM(1-\alpha)+\alpha CM$, where DM is the differential mode, CM is the common mode and $\alpha$ is a variable less than unity. The amount of balance in a wireline system is also generally recognised to be the ratio on the continuous mode to the differential mode, i.e. DM/CM. Balance is seldom poor over the entire useable frequency range, and imperfections that cause imbalance are usually localised (as previously stated).

Balance is often determined using a technique known as longitudinal conversion loss (LCL), which technique will be readily appreciated to the skilled addressee.

Generally, as will be understood, a wireline communication system is a resonant structure and therefore susceptible to reflections and the associated detrimental radiation effects caused by common mode transmission (particularly in relation to standing waves). Therefore, the resonant frequencies are particularly bad (in the sense of high level) as energy and signal radiators.

As previously indicated, xDSL technologies support broadband data transmissions at relatively high frequencies above and isolated from those frequencies used for existing wireline (voice band) communication or power supplies. Unfortunately, notwithstanding that strict power spectral densities are imposed on such transmissions, e.g. −60dBm per Hz and −40 dBm per Hz for VDSL and ADSL, respectively, these broadband transmissions effectively (and presently) pollute large portions of the available (radio) spectrum where the balance is poor.

In order to preserve certain (or sensitive) frequency bands, some proposed regulations already require the radio amateur spectral bands to be notched out (i.e. filtered) so as to avoid direct carrier interference. This concept of selective notching is already prevalent in most radio-based communication systems, such as within the Digital European Cordless Telephone (DECT) system and the Global System for Mobile (GSM) communication.

Stringent EMC (electromagnetic compatibility) requirements that define the amount of radiation from a device or its susceptibility to incident radiation are, in fact, already in place with respect to radio communication apparatus, e.g. cellular radiotelephones. Moreover, such EMC requirements are likely to be imposed in relation to wireline communication systems to preserve data transmissions in the radio and microwave environments, while also protecting circuitry within equipment from any harmful effects caused by such irradiation. Consequently, the problems associated with line mismatch (imbalance) and the establishment of standing waves are becoming an increasing focus of attention in wireline systems. In fact, radio authorities are already demanding a balance for xDSL-type wireline systems of 30 dB (or better) to avoid excessive EMC and radiation problems in general. A need therefore exists for a mechanism that effectively reduces the amount of radiation from a wireline communication resource, especially at the relatively high frequencies of xDSL, so as to improve electromagnetic compatibility.

SUMMARY OF THE INVENTION

According to a first aspect of the present invention there is provided a method of establishing a traffic connection in a wireline communication resource interconnecting modems that support the traffic connection using a multiplicity of channel carriers, the method comprising the steps of: from a first modem, transmitting a training sequence on at least some of the channel carriers; at an addressed modem, monitoring at least some of the channel carriers in an attempt to recover the training sequence, the step of monitoring further including the steps of: with respect to channel carriers on which the training sequence is recovered, assessing a quality of the training sequence with respect to a differential transmission mode and a common transmission mode to form a balance value for the respective channel carrier; and de-selecting, for the traffic connection, those channel carriers having a balance value below a predetermined threshold.

In another aspect of the present invention there is provided a modem supporting multi-carrier data transmission through a wireline communication resource, the modem comprising: means for assessing quality of incident training bits with respect to a differential transmission mode and a common transmission mode for each of a multiplicity of channel carriers; means for forming a balance value for each channel carrier; and means for deselecting those channel carriers having a balance value below a predetermined threshold.

In yet another aspect of the present invention there is provided a modem operational in a multi-carrier wireline environment, the modem comprising: a line interface containing an isolation transformer having a first winding across which a differential transmission mode signal can be observed and a second winding having a substantially centralised tap point that provides a common transmission mode signal relative to a reference point; and a receive chain containing: a channel analyser coupled selectively to receive the differential transmission mode signal and the common transmission mode signal of selected channel carriers, the channel analyser further arranged to provide an indication of balance with respect to the selected channel carriers; a memory for storing a predetermined threshold value indicative of a nominally acceptable balance for the wireline; and a controller coupled to the memory and responsive to the channel analyser, the controller further comprising means for de-selecting channel carriers for use in a traffic call based upon the balance of that particular carrier with respect to the predetermined threshold.

In a preferred embodiment the modem further comprises a transmit chain coupled to the line interface and operationally responsive to the controller, and wherein: the controller is arranged generate, in response to the indication of balance of the channel carriers, a control message that is applied to the transmit chain for transmission from the modem; and the control message includes information pertaining to at least one of data rate and channel carrier identities relevant to the traffic call.

The present invention therefore advantageously reduces the amount of power radiated from a wireline communication resource by selectively rejecting frequency sub-carriers that are particularly susceptible to resonance. In other words, sub-carriers that support common mode (or hybrid mode) transmission are loaded with zero power. In other words, EMC problems are avoided by selectively ignoring portions of the spectrum in which balance is poor, and especially for a particular copper pair (and also on a pair by pair basis).

Beneficially, the modems of the preferred embodiment require little modification from those already known in the art and hence can provide a significant improvement in system operation at negligible additional cost and minor structural alteration. In fact, the sub-channel analyser may be implemented entirely within code, whilst roll-out of the improved modems and systems is fully compliant with existing wireline systems, i.e. there is a backward compatibility.

BRIEF DESCRIPTION OF THE DRAWINGS

An exemplary embodiment of the present invention will now be described with reference to the accompanying drawings, in which.

DETAILED DESCRIPTION OF A PREFERRED EMBODIMENT

Figure 1:
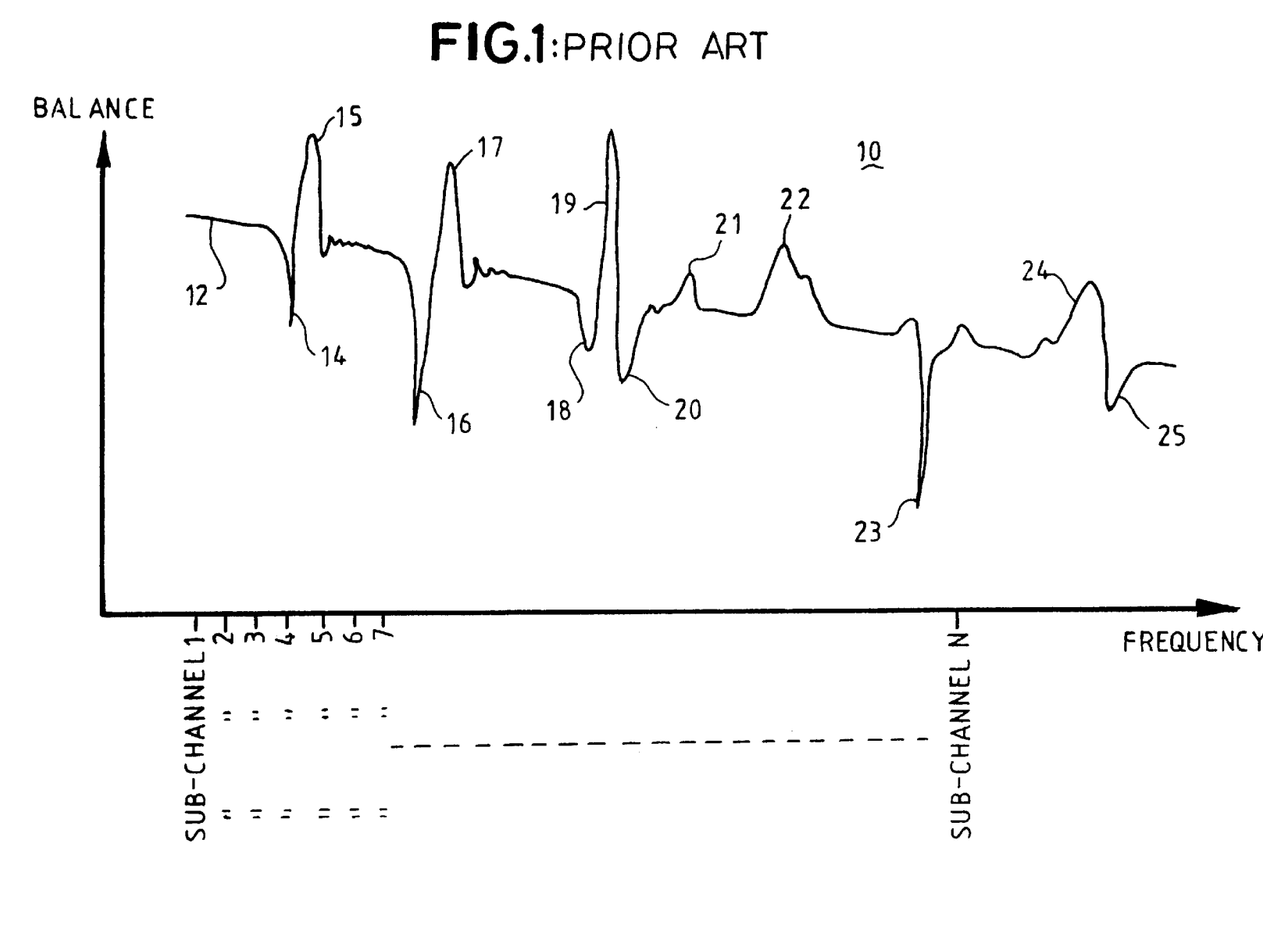
FIG. 1 is a spectral diagram indicating the effects of resonant frequencies on wireline balance.

Turning attention briefly to FIG. 1, there is shown a spectral diagram 10 indicating the effects on wireline balance of impedance mismatches. As will readily be appreciated, balance 12 generally decreases as a function of increasing frequency, although abrupt changes in impedance within the wireline cause significant deviations 14–25 from a nominally constant decline in balance. In other words, balance is "peaky" in the frequency domain. The major negative deviations 14, 16, 18, 20, 23 and 25 (i.e. those for poor balance) represent frequencies at which resonance may occur within the wireline, but certainly represent frequencies that, undesirably, radiate significant amounts of energy that pollutes the frequency spectrum.

Figure 2:
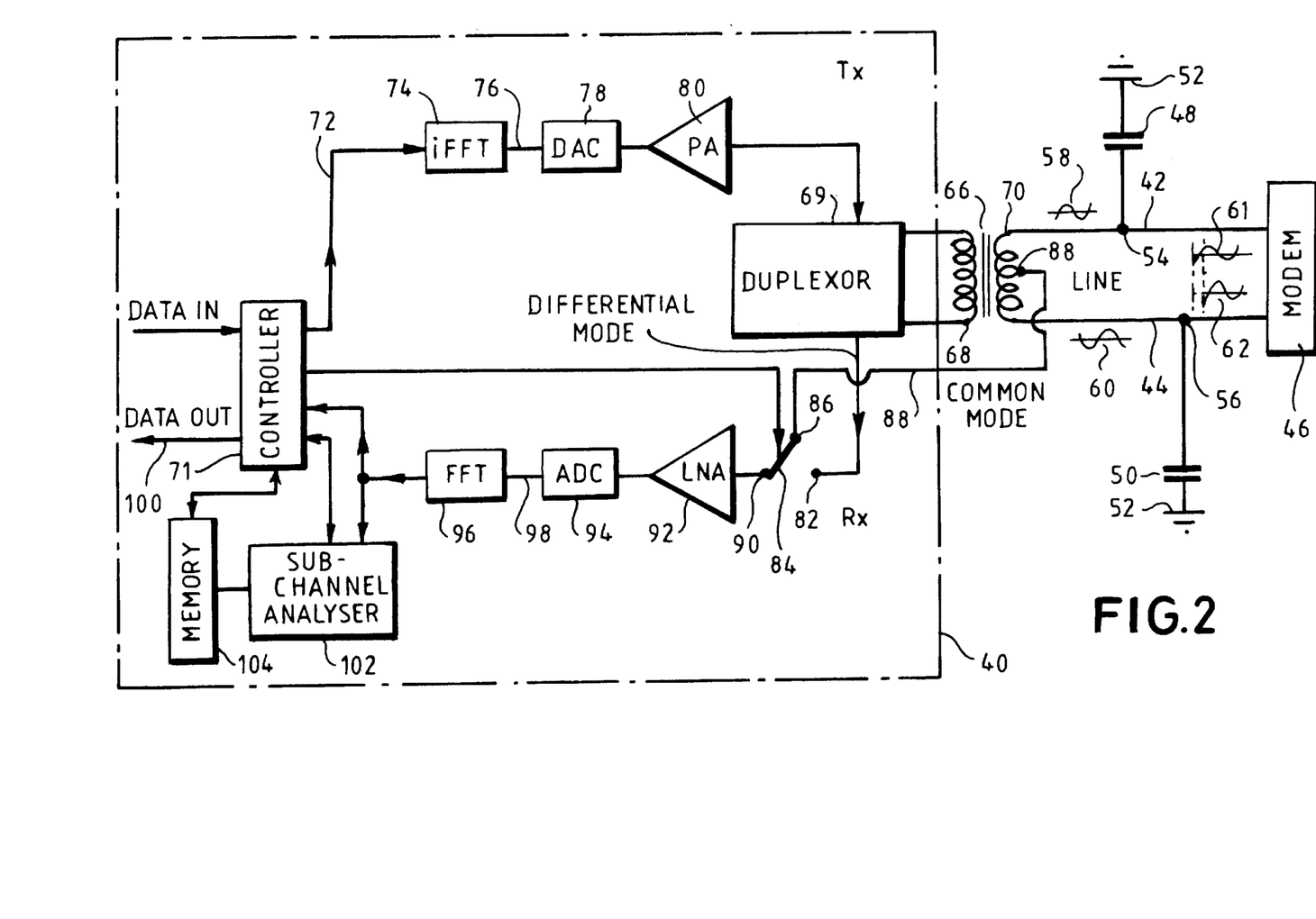
FIG. 2 is a block diagram of a modem and an interconnected wireline communication system according to preferred embodiments of the present invention.

FIG. 2 is a block diagram of a modem 40 and an interconnected wireline communication system 42–44 according to preferred embodiments of the present invention. In an exemplary embodiment, the modem 40 is arranged to support xDSL-type transmissions, although other frequency bands (of relatively higher or relatively lower frequency could be used) and different communication protocols are also readily within the general concept of the present invention. The modem 40 is in communication with a secondary modem 46 via the wireline communication system 42–44, e.g. a twisted copper pair. The wireline communication resource 42–44 generally operates in a transmission mode in which radiation is limited (i.e. the differential mode), although imperfections (represented by capacitances 48–50 to ground 52) within the wireline cause line mismatching to occur and resonance nodes 54–56 to be established at abrupt changes in impedance. As will be appreciated, the resonance nodes 54–56 act to establish standing waves (not shown) within the wireline and result in conversion from a differential transmission mode to common transmission mode, as indicated by the relative phase changes in the waveform 58–61.

The modem 40 and the secondary modem 46 are in communication with one another through a control channel that is supported in the wireline communication resource, although actual traffic may be unidirectional or bi-directional. The structure of modem 40 is shown in expanded view, although it is anticipated that modem 46 shares this common (but not necessarily identical) functional configuration. Furthermore, although the modems 40 and 46 can communicate using a plurality of different protocols, the preferred embodiment of the present invention generally supports multiple sub-channel carriers, e.g. DMT in a VDSL system.

The underlying concept of the present invention is the use of a line code that allows selected parts of the spectrum to be left unused or for such selected parts of the spectrum to have a reduced power spectral density. More specifically, the modems utilise a training sequence to decide which sub-channel carriers are to be used for subsequent communicated traffic (typically data, such as high bandwidth video or Internet information). Moreover, the training sequence is used to assess the bit allocation scheme, i.e. the effective bit capacity (if any), of each sub-channel carrier. In contrast with existing modems that merely utilise a signal-to-noise ratio (S:N) of each sub-channel carrier for the fixed training pattern in the differential transmission mode, the preferred embodiment of the present invention supplements received differential mode information with distinct common mode information to formulate a more effective assessment of balance within a communication resource. Subsequently, the balance assessment is used to identify sub-channel carriers that support increased energy radiation, reduced energy radiation or carriers that are de-selected and left unused.

Looking to the functional configuration of modem 40 and its coupling to the wireline communication resource 42–44, a line transformer 66 (typically a balanced/unbalanced (balun) transformer) has a primary winding 68 coupled to a duplexer 69 of the modem 40 and a secondary winding 70 coupled across the wireline 42–44. Signals are therefore (principally) inductively coupled between the modem 40 and the wireline communication resource 42–44, with the transformer effectively providing a mechanism of isolation.

In a transmit chain of the modem 40, data is applied to a controller 71 that acts to control the operation of the modem 40; the controller 71 is typically a microprocessor or digital signal processor (DSP). More specifically, but without limitation, the controller 71 may function to control encoding and modulation of data onto the sub-channel carriers, while also providing error correction, interleaving of data, operation timing, baud rate and the administration (i.e. the generation and interpretation) of control information in relation to a call. Suitably modulated data 72, output under the control of the controller 71, is then applied to an inverse fast-Fourier Transform (IFFT) block, usually realised within a DSP, that converts frequency domain information into time domain data 76 for application to a digital to analog converter (DAC) 78. An analog signal emerging from the DAC 78 is then amplified in a power amplifier 80 before being coupled to the duplexer 69.

In a receive chain of the modem 40, received modulated data (conveyed in a differential mode through the wireline communication resource 42–44) is applied to a first input terminal 82 of a switch 84 that is operable under control by the controller 71. A second input terminal 86 of the switch 84 is coupled a tap 88 (substantially centrally located) on the secondary winding 70 of the line transformer 68. The tap 88 provides a common mode path (relative to ground) from the wireline communication path 42–44 to the receive chain. An output terminal 90 of the switch 84 is therefore arranged to provide, on a selective basis, one of a common mode signal and a differential mode signal (as appearing across the terminals of the primary winding 68) from the wireline communication resource to the receive chain. The output terminal 90 is coupled in series to a low noise amplifier (LNA) 92, an analog to digital converter (ADC) 94 and a FFT 96 that converts digital time domain signals 98 into frequency domain digital and modulated signals.

The tap, although preferably on the line side of the system, may alternatively be placed on the equipment side. Furthermore, it is preferably to provide a central tap because this represents the point of optimum common mode transmission.

The controller 71, which also acts to provide decoding of modulated signals to provide data output 100, is coupled to receive the digital and modulated frequency domain signals from the FFT 96. The digital and modulated frequency domain signals are also coupled to a sub-channel analyser 102 that provides balance assessment of each sub-channel to the controller 71. In a preferred embodiment, therefore, the sub-channel analyser 102 is realised as a DSP function that, typically, implements a longitudinal conversion loss (LCL) measurement. The sub-channel analyser 102 may therefore be coupled to a memory 104 used to store differential mode and common code information from the wireline communication resource in relation to each sub-channel carrier. Typically, the memory also serves the controller 71 and may, therefore, contain information pertaining to a training sequence for use by the modem in setting up a connection.

As will be understood, the training sequence basically provides a given predetermined pattern of data words or bits that are modulated by the modem and transmitted over the communication resource 42–44 using, eventually, all sub-channel carriers. The data words or bits may be sent across group of sub-channels. A modem receiving the training sequence can then demodulate the data words or bits and contrast the results to determine the integrity of the received data words or bits with the predetermined pattern that is already known to the receiving modem. Before initiating the connection for traffic, both directions may need to be tested since attenuation or radiation properties in the alternative directions may not necessarily be the same. Therefore, by way of data word or bit assessment at the receiving modem (at each end of the call, as necessary), a negotiation between the modems involved in the call can resolve out which sub-channel carriers are to be avoided for the traffic call.

Figure 3:
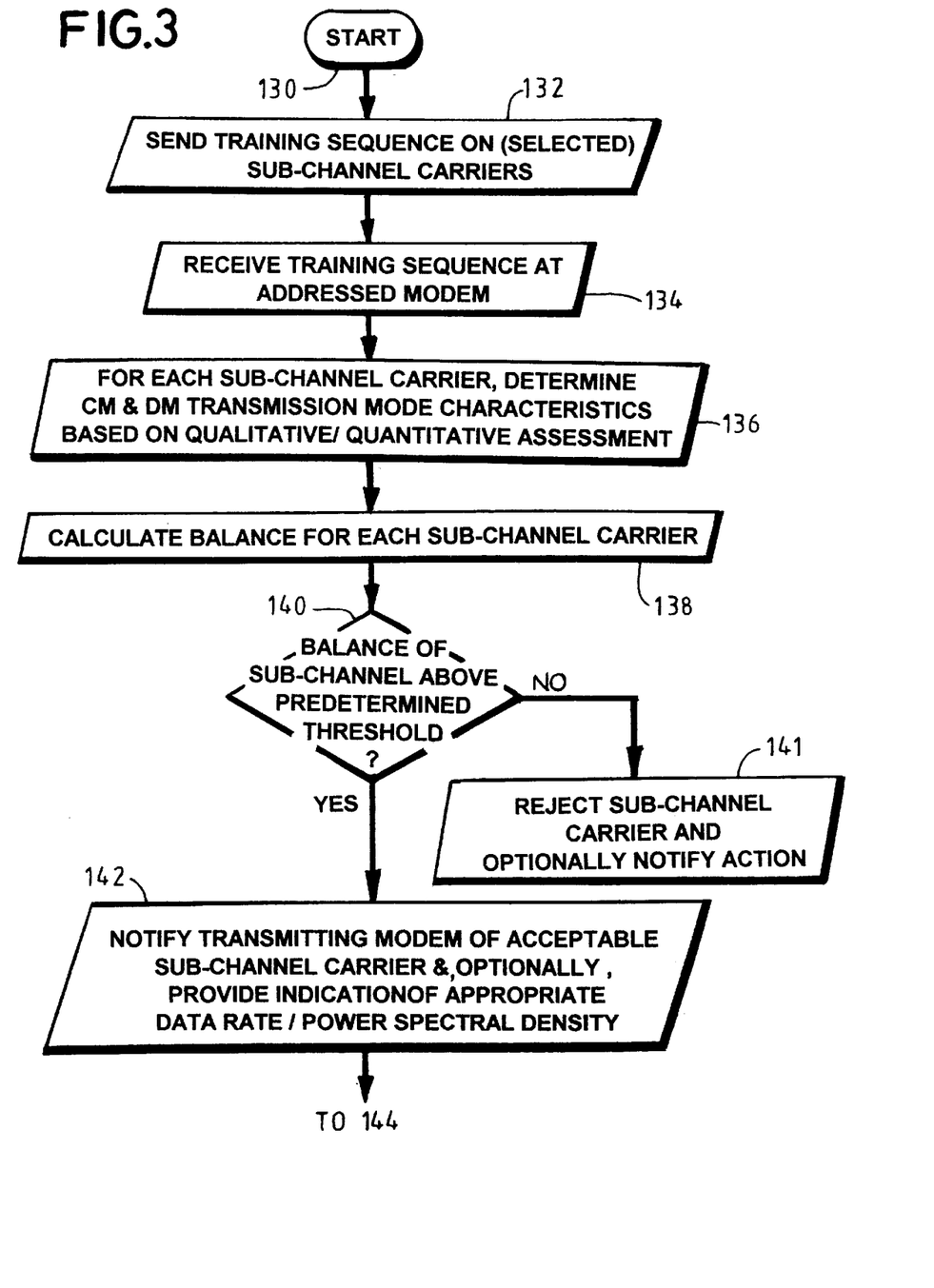
FIG. 3 is a flow diagram of a training method, in accordance with a preferred embodiment of the present invention, used to set-up modem operation in the wireline system of FIG. 2.

Returning to the present invention, the mechanism underlying the preferred embodiment is shown in the flow diagram of FIG. 3; the process begins at "START" block 130. A training sequence is sent 132 on selected but ultimately all sub-channel carriers, with the training sequence subsequently received 134 at an addressed modem. For each sub-channel carrier, a qualitative or quantitative assessment 136 of the common mode and differential mode transmission characteristics is made to determine 138 a balance for each sub-channel carrier. The controller 71 then makes an assessment 140 as to whether the balance of each sub-channel carrier exceeds a predetermined level or threshold. The threshold may be a specific function of frequency that depends upon a known allocation of the spectrum to different services and users in the location of deployment. For example, coastal areas might have different thresholds and so the system may be more sensitive to maritime services.

In the negative 142, the sub-channel carrier is rejected 141 and, preferably, notification of this rejection is communicated to the modem from which the training sequence originated. If the sub-channel carrier has an acceptable balance, then the process proceeds to a stage where, preferably, the transmitting modem is explicitly notified of the acceptability of the sub-channel carrier. Optionally (but preferably), an indication as to an appropriate data rate or power spectral density is communicated 142.

Basically, the step of calculating the balance and selecting/de-selecting sub-channel carriers identifies line mismatches generally (and principally resonance problems), whereafter any multi-carrier based modem can optimise transmissions based on a selected use (or notching out) of carrier frequencies.

In the event that there are more sub-channels available than are initially required for a call, then one of a number of bit allocation schemes can be used 144–146. For instance, those sub-channel carriers that provide minimum emissions can be selected for use. Alternatively, the information can be spread equally over all sub-channel carriers based on their individual signal to noise ratios. The location of any sub-channel carriers that represent excess capacity may be stored in memory 104 for later use. Also, a preferred embodiment uses a control channel to notify of any excess capacity.

Should there be insufficient numbers of sub-channels that satisfy the balance requirement, then the controller 71 may opt for an increase 148 in data rate/PSD on the good sub-channel carriers (which may require sending of a notification over the control channel). Alternatively, the modem will need to drop back to a lower data rate.

Once the modems have agreed the use of sub-channel carriers (and data rates, if necessary), the call can commence 150. At this point, some sub-channel carriers have been de-selected by virtue of their liability to radiate energy at a level that is incompatible with EMC or determined operating parameters for the system, in general.

In an in-call scenario it may be desirable to increase throughput for the call (step 152). If the capacity is, however, always fixed or is generally acceptable, then the system merely remains in a data pipe mode where there is an assessment of call continuity 154 and in-call capacity requirements, i.e. step 152. If the call ends 156 (or there is a requirement for re-training or bit reallocation when, for instance, a noise source has emerged since the modem was last trained), the sub-channel carriers that were de-selected may remain de-selected or may be returned to the available pool of sub-channel carriers to allow assessment on a per call basis. If additional sub-channel carriers are required to support an increase in capacity, then the system consults its memory to determine 158 whether any additional sub-channels carriers are available. In the affirmative, the sub-channels are selected 160 and utilised in-call; notification over the control channel may be required, as will be understood. In the event that no additional sub-channels are available, then the presently selected ("good") sub-channels may be adapted, if possible, to support and increased data rate or increased PSD (step 162). Following steps 160 and 162, the process returns to in-call monitoring, namely step 152.

Typically, the communication system of the preferred embodiment of the present invention is configured such that, whilst one modem is transmitting the training sequence in the differential mode, the same modem is arranged to assess common mode properties; this save set-up time.

The requirement for suppressing or notching out parts of the spectrum because of poor balance is particularly applicable to customer premise equipment (CPE) when its final drop is an aerial cable; the loss in capacity will therefore typically have greatest effect in the up-link (or up-stream) direction towards network termination equipment (LTE), such as the line card in an exchange. Any loss in capacity, however, can usually be compensated for by increasing bit-rate or PSD, as previously detailed. However, in this latter respect, it will be appreciated that one must bear in mind the possible detrimental effects associated with Far End Cross Talk (FEXT) which could increase interference for other users; this is only an issue, however, in a multi-bundled environment in which simultaneous transmission occur.

In summary, the present invention adds a second level of decision making process to the selection of sub-channel carriers for a communication, which second level is realised, for example, by an assessment of a signal to noise ratio in the common mode. Since an S:N ratio is also determined for the differential mode for each sub-channel carrier, an assessment of balance can be made by the modems in the system and sub-channels can be rejected should the balance fall below a predetermined threshold (which could be frequency dependent in one embodiment of the present invention). Alternatively, the assessed balance may be sufficiently good across the entire spectrum to support higher rates of communication through the use of more sub-channels or a higher packing of bits per sub-channel carrier. Of course, if a constant baud rate is required, then a system offering excess capacity may merely select those sub-channel carriers that demonstrate the best balance. Therefore, the present invention is better equipped to de-select those sub-channel carriers that present a particular problem in relation to energy radiation into the communication spectrum (and particularly the radio spectrum) to an extent that EMC is accentuated in the wireline communication system of the preferred embodiment of the present invention. In other words, the present invention tailors bit carrier allocation across all available carriers to reflect balance and S:N of the carriers.

It will be appreciated that the threshold against which the balance value of a sub-channel carrier is compared is arbitrary. Indeed, the balance value calculated for the sub-channel gives only an indication of the likely radiation from the wireline communication resource during operation at a particular carrier frequency, and so the threshold is usually selected to provide some tolerance level (and, indeed, may be better than that permitted within a technical standard). Consequently, if a sub-channel carrier has only marginally failed the balance assessment then it may still be possible to increase the power level in that particular carrier in order to support a levitated bit rate whilst still remaining within EMC requirements.

It will, of course, be appreciated that the above description has been given by way of example only and that modification in detail may be made within the scope of the present invention. For example, the concepts of the present invention are described in relation to a generic time domain modem, but it will be appreciated that the underlying inventive concept is equally applicable to schemes that employ either time domain duplexing (TDD) or frequency domain duplexing (FDD).

We claim:

1. A method of establishing a traffic connection in a wireline communication resource interconnecting modems that support the traffic connection using a multiplicity of channel carriers, the method comprising the steps of:

from a first modem, transmitting a training sequence on at least some of the channel carriers;

at an addressed modem, monitoring at least some of the channel carriers in an attempt to recover the training sequence, the step of monitoring further including the steps of:

with respect to channel carriers on which the training sequence is recovered, assessing a quality of the training sequence with respect to a differential transmission mode and a common transmission mode to form a balance value for the respective channel carrier; and de-selecting, for the traffic connection, those channel carriers having a balance value below a predetermined threshold.

2. The method as claimed in claim 1, further comprising the step of notifying the first modem of those channel carriers that have been de-selected.

3. The method as claimed in claim 1, further comprising the step of storing identities of those channel carriers having a balance value above the predetermined threshold.

4. The method as claimed in claim 1, further comprising the step selecting at least one of a data rate and a power spectral density for use on those channel carriers having a balance value above the predetermined threshold.

5. The method as claimed in claim 3, further comprising the steps of:

determining whether there exist more channel carriers having a balance value above the predetermined threshold than that are required for the traffic connection; and selecting for use those channel carriers offering optimum performance for the traffic connection.

6. The method as claimed in claim 5, further comprising the steps of:

in the event that the step of determining indicates that the traffic connection requires more channel carriers than those available by virtue of their balance value being above the predetermined threshold, one of the steps of:

reducing a data rate for the traffic connection;

increasing one of the power spectral density across the channel carriers and a data rate applied to at least one of the channel carriers having a balance value above the predetermined threshold; and selecting a channel carrier that has a balance level marginally below the predetermined threshold and applying a relatively low bit rate thereto for the traffic connection.

7. The method as claimed in claim 5, further comprising the step of notifying the first modem of any change in power spectral density and data rate.

8. The method as claimed in claim 1, further comprising the steps of:

identifying, in-call, a requirement for a variation in capacity for the traffic connection; and at least one of:

a) adjusting at least one of the power spectral density and a data rate for channel carriers having a balance value above the predetermined threshold; and b) selecting and using at least one previously unused channel carrier having a balance value above the predetermined threshold.

9. The method as claimed in claim 8, further comprising the step of sending a notification of any change in the power spectral density and data rate between the modems.

10. The method as claimed in claim 1, further comprising the steps of:

determining the termination of a call; and selectively releasing those channel carriers having a balance value below the predetermined threshold back into a pool of available channel carriers for use in a succeeding call.

11. The method as claimed in claim 1, wherein the training sequence is a realised as a distribution of predetermined bits.

12. The method as claimed in claim 1, wherein the training sequence is communicated using all available channel carriers.

13. The method as claimed in claim 1, wherein each modem is coupled to the wireline communication resource through an isolation transformer, and the step of assessing the quality further comprises the steps of:

providing a centre tap to a line-side winding of the isolation transformer, whereby the centre tap provides the common transmission mode measurement for the channel carriers.

14. The method as claimed in claim 1, wherein the predetermined threshold is a function of at least one of environment and frequency.

15. A modem supporting multi-carrier data transmission through a wireline communication resource, the modem comprising:

means for assessing quality of incident training bits with respect to a differential transmission mode and a common transmission mode for a multiplicity of channel carriers;

means for forming a balance value for each channel carrier; and means for de-selecting those channel carriers having a balance value below a predetermined threshold.

16. The modem of claim 15, further comprising an isolation transformer arranged for coupling to the wireline communication resource, the isolation transformer comprising a primary winding having differential terminals across which the differential transmission mode is observed and a secondary winding having a centre tap from which, relative to ground, the common transmission mode is derived.

17. The modem as claimed in claim 15, further comprising means for notifying the first modem of those channel carriers that have been de-selected.

18. The modem as claimed in claim 15, further comprising a memory for storing identities of those channel carriers having a balance value above the predetermined threshold.

19. The modem as claimed in claim 15, further comprising means for selecting at least one of a data rate and a power spectral density for use on those channel carriers having a balance value above the predetermined threshold.

20. The modem as claimed in claim 18, further comprising:

means for determining whether there exist more channel carriers having a balance value above the predetermined threshold than that are required for the traffic connection; and means for selecting for use those channel carriers offering optimum performance for the traffic connection.

21. The modem as claimed in claim 20, further comprising at least one of:

means, responsive to in the means for determining indicating that the traffic connection requires more channel carriers than those available by virtue of their balance value being above the predetermined threshold, for reducing a data rate for the traffic connection;

means, responsive to in the means for determining indicating that the traffic connection requires more channel carriers than those available by virtue of their balance value being above the predetermined threshold, for increasing one of the power spectral density across the channel carriers and a data rate applied to at least one of the channel carriers having a balance value above the predetermined threshold; and means, responsive to in the means for determining indicating that the traffic connection requires more channel carriers than those available by virtue of their balance value being above the predetermined threshold, for selecting a channel carrier that has a balance level marginally below the predetermined threshold and means for applying a relatively low bit rate thereto for the traffic connection.

22. The modem as claimed in claim 21, further comprising means for notifying the first modem of any change in power spectral density and data rate.

23. The modem as claimed in claim 15, further comprising:

means for identifying, in-call, a requirement for a variation in capacity for the traffic connection; and at least one of:

a) means for adjusting at least one of the power spectral density and a data rate for channel carriers having a balance value above the predetermined threshold; and b) means for selecting and using at least one previously unused channel carrier having a balance value above the predetermined threshold.

24. The modem as claimed in claim 23, further comprising means for sending a notification of any change in the power spectral density and data rate between the modems.

25. The modem as claimed in claim 15, further comprising the steps of:

means for determining the termination of a call; and means for selectively releasing those channel carriers having a balance value below the predetermined threshold back into a pool of available channel carriers for use in a succeeding call.

26. The modem as claimed in claim 15, wherein the training sequence is a realised as a distribution of predetermined bits.

27. The method as claimed in claim 15, wherein the training sequence is communicated using all available channel carriers.

28. The modem as claimed in claim 15, wherein the predetermined threshold is a function of at least one of environment and frequency.

29. A modem operational in a multi-carrier wireline environment, the modem comprising:

a line interface containing an isolation transformer having a first winding across which a differential transmission mode signal can be observed and a second winding having a substantially centralised tap point that provides a common transmission mode signal relative to a reference point; and a receive chain containing:

a channel analyser coupled selectively to receive the differential transmission mode signal and the common transmission mode signal of selected channel carriers, the channel analyser further arranged to provide an indication of balance with respect to the selected channel carriers;

a memory for storing a predetermined threshold value indicative of a nominally acceptable balance for the wireline; and a controller coupled to the memory and responsive to the channel analyser, the controller further comprising means for de-selecting channel carriers for use in a traffic call based upon the balance of that particular carrier with respect to the predetermined threshold.

30. The modem as claimed in claim 29, further comprising a transmit chain coupled to the line interface and operationally responsive to the controller, and wherein:

the controller is arranged generate, in response to the indication of balance of the channel carriers, a control message that is applied to the transmit chain for transmission from the modem; and the control message includes information pertaining to at least one of data rate and channel carrier identities relevant to the traffic call.

31. The modem as claimed in claim 29, wherein the controller further comprises means for adjusting at least one of the power spectral density and a data rate of the channel carriers in response to the indication of balance.

* * * * *